US010429035B2

(12) United States Patent
Hukkanen et al.

(10) Patent No.: US 10,429,035 B2
(45) Date of Patent: Oct. 1, 2019

(54) OPTICAL DEVICE FOR MODIFYING LIGHT DISTRIBUTION

(71) Applicant: Ledil Oy, Salo (FI)

(72) Inventors: Hannu Hukkanen, Salo (FI); Kimmo Harjunpää, Salo (FI)

(73) Assignee: Ledil Oy, Salo (FI)

( * ) Notice: Subject to any disclaimer, the term of this patent is extended or adjusted under 35 U.S.C. 154(b) by 69 days.

(21) Appl. No.: 15/744,230

(22) PCT Filed: Sep. 13, 2017

(86) PCT No.: PCT/FI2017/050653
§ 371 (c)(1),
(2) Date: Jan. 12, 2018

(87) PCT Pub. No.: WO2018/138406
PCT Pub. Date: Aug. 2, 2018

(65) Prior Publication Data
US 2019/0003684 A1    Jan. 3, 2019

(30) Foreign Application Priority Data

Jan. 25, 2017  (FI) ..................................... 20175063

(51) Int. Cl.
*F21V 13/04*          (2006.01)
*F21V 5/04*           (2006.01)
(Continued)

(52) U.S. Cl.
CPC ................ *F21V 13/04* (2013.01); *F21V 5/04* (2013.01); *F21V 5/08* (2013.01); *F21V 7/0091* (2013.01);
(Continued)

(58) Field of Classification Search
CPC .......... F21V 13/04; F21V 7/04; F21V 7/0091; F21V 5/04; F21V 5/08; F21V 13/02;
(Continued)

(56) References Cited

U.S. PATENT DOCUMENTS

2008/0025044 A1    1/2008  Park et al.
2013/0039090 A1*   2/2013  Dau .......................... F21S 8/04
                                                              362/551
(Continued)

FOREIGN PATENT DOCUMENTS

EP    2711615 A1    3/2014
EP    2804029 A2    11/2014
(Continued)

*Primary Examiner* — Bao Q Truong
*Assistant Examiner* — Glenn D Zimmerman
(74) *Attorney, Agent, or Firm* — Young & Thompson

(57) ABSTRACT

An optical device for modifying a light distribution pattern of a light source is presented. The light source radiates first light beams to a first geometric quarter-space and second light beams to a second geometric quarter-space, where the first and second quarter-spaces are defined by mutually perpendicular geometric planes one of which constitutes a boundary between the first and second geometric quarter-spaces. The optical device may include a lens-section for modifying a light distribution pattern of the first light beams and a reflector surface for reflecting at least a part of the second light beams from the second geometric quarter-space to the first geometric quarter-space. The reflector surface is shaped to resemble a wedge that points towards the first geometric quarter-space so as to provide total internal reflection and to direct the reflected second light beams to sideward directions.

14 Claims, 8 Drawing Sheets

(51) Int. Cl.
*F21V 5/08* (2006.01)
*F21V 7/00* (2006.01)
*F21V 8/00* (2006.01)
*G02B 19/00* (2006.01)
*F21V 7/04* (2006.01)
*F21W 131/103* (2006.01)
*F21Y 115/10* (2016.01)
*B29D 11/00* (2006.01)

(52) U.S. Cl.
CPC .............. *F21V 7/04* (2013.01); *G02B 6/0001* (2013.01); *G02B 19/0028* (2013.01); *G02B 19/0061* (2013.01); *B29D 11/0048* (2013.01); *F21W 2131/103* (2013.01); *F21Y 2115/10* (2016.08)

(58) Field of Classification Search
CPC ... F21V 13/00; F21V 5/00; F21V 7/06; F21V 7/07; F21V 7/08; F21V 7/0025; F21V 7/00; G02B 19/0061; G02B 19/0028; G02B 6/0001; F21Y 2115/10; B29D 11/0048; F21W 2131/103
See application file for complete search history.

(56) References Cited

U.S. PATENT DOCUMENTS

| | | | |
|---|---|---|---|
| 2014/0126235 A1* | 5/2014 | Speier | F21S 8/04 362/555 |
| 2014/0192521 A1 | 7/2014 | Laakkio | |
| 2016/0109645 A1* | 4/2016 | Dau | F21V 7/0008 362/612 |
| 2016/0252234 A1 | 9/2016 | Holder et al. | |

FOREIGN PATENT DOCUMENTS

| | | |
|---|---|---|
| EP | 2924345 A1 | 9/2015 |
| WO | 2012118828 A2 | 9/2012 |
| WO | 2014044926 A2 | 3/2014 |

* cited by examiner

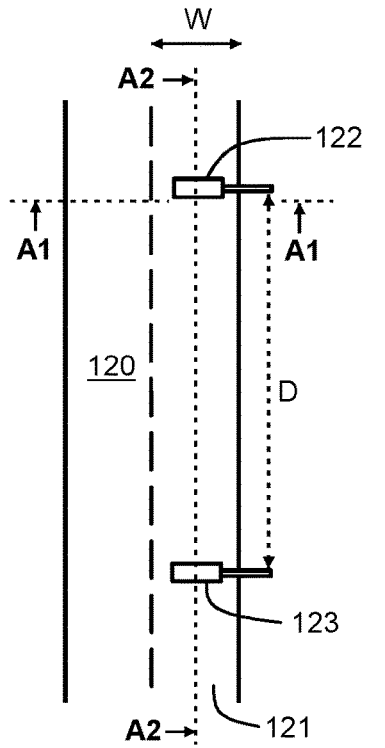
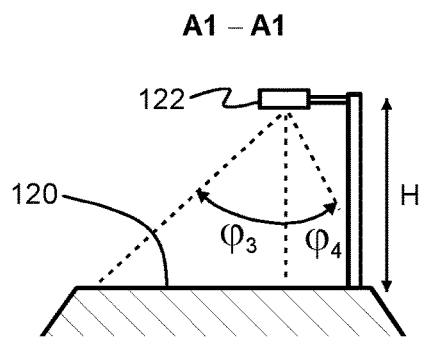
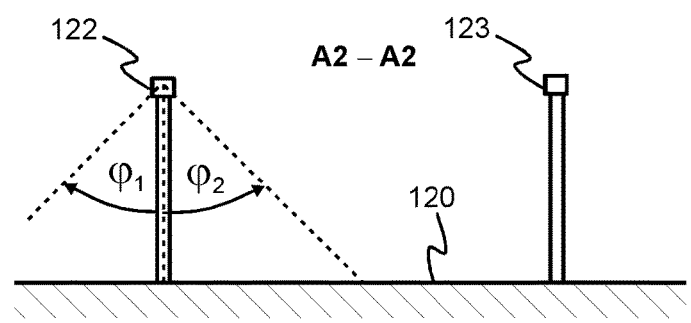
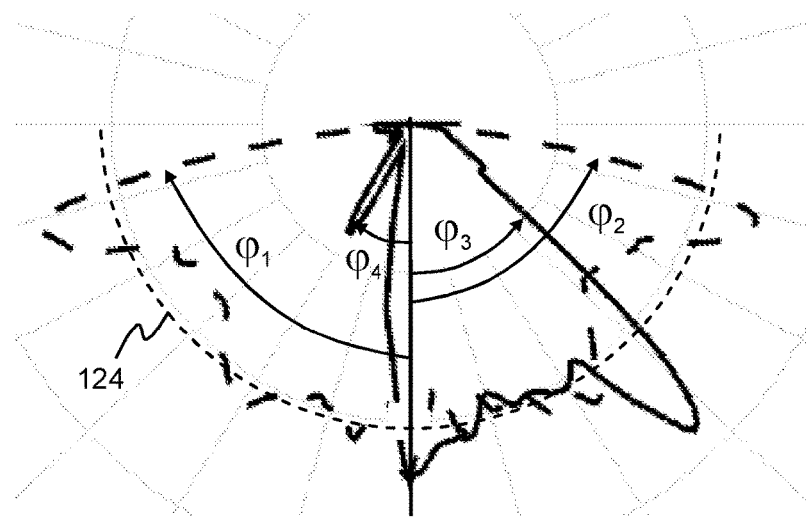
Figure 1a
Prior art
Figure 1b
Prior art
Figure 1c
Prior art
Figure 1d
Prior art

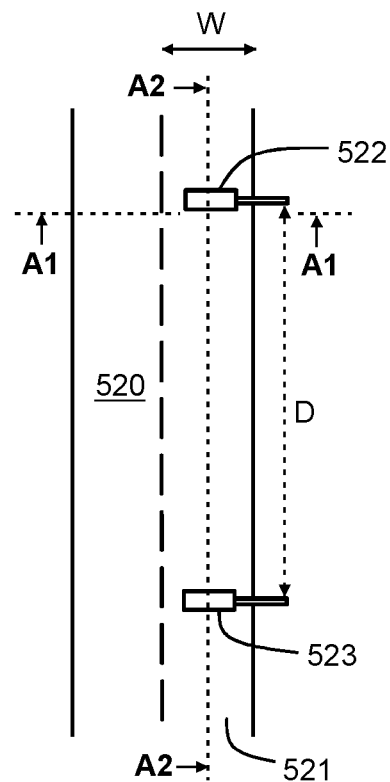
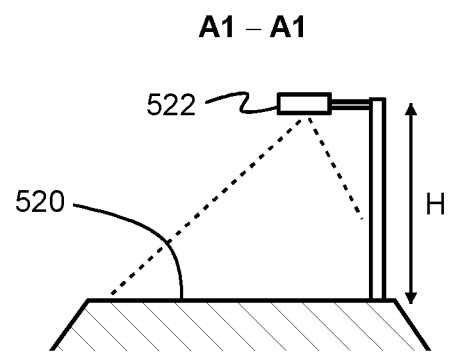
Figure 5b
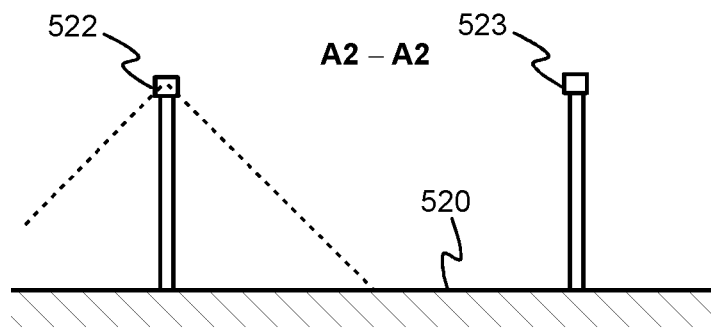
Figure 5c
Figure 5a

OPTICAL DEVICE FOR MODIFYING LIGHT DISTRIBUTION

FIELD OF THE DISCLOSURE

The disclosure relates generally to illuminating engineering. More particularly, the disclosure relates to an optical device for modifying a light distribution pattern of a light source that can be, for example but not necessarily, a light emitting diode "LED".

BACKGROUND

Distribution of light produced by a light source can be important or even critical in some applications. The light source can be, for example but not necessarily, a light emitting diode "LED", a filament lamp, or a gas-discharge lamp. FIG. 1a shows a schematic illustration of a street lighting application where streetlamps 122 and 123 are arranged to illuminate a road 120. FIG. 1b shows a view of a section taken along the line A1-A1 shown in FIG. 1a, and FIG. 1c shows a view of a section taken along the line A2-A2 shown in FIG. 1a. Each of the streetlamps 122 and 123 may comprise, for example, a lighting fixture that comprises a plurality of light sources, e.g. light emitting diodes "LED", and optical devices each of which being arranged to modify the light distribution pattern of one or more of the light sources. An exemplifying optical device 101 according to the prior art is illustrated in FIGS. 1e and 1f where FIG. 1f shows a view of a section taken along the line A-A shown in FIG. 1e. A light source 102 is arranged to radiate first light beams to a first geometric quarter-space 103 and second light beams to a second geometric quarter-space 104, where the first and second geometric quarter-spaces are defined by mutually perpendicular geometric planes 105 and 106 so that the geometric plane 105 constitutes a boundary between the first and second geometric quarter-spaces 103 and 104. In FIGS. 1e and 1f, some of the first light beams are depicted with dot-and-dash line arrows and some of the second light beams are depicted with dashed line arrows. It is to be noted that the above-mentioned geometric planes 105 and 106 are mere geometric concepts for illustrative purposes only but not physical elements of the optical device 101 or of the light source 102. The geometric plane 105 is parallel with the yz-plane of a coordinate system 199 and the geometric plane 106 is parallel with the xy-plane of the coordinate system 199. The optical device 101 comprises a lens-section 107 for modifying a light distribution pattern of the first light beams. The optical device 101 comprises a reflector surface 108 for reflecting at least a part of the second light beams to the first quarter-space 103 as illustrated in FIGS. 1e and 1f. The reflector surface 108 is a surface of a cavity 109. The geometric forms of the cavity 109 and the refractive index of the transparent material of the optical device 101 are selected so that the total reflection takes place on the reflector surface 108.

FIG. 1d shows polar plots illustrating simulated luminance distributions on the surface of the road 120 when optical devices of the kind described above are being used in an exemplifying situation where the distance D between the adjacent streetlamps is about 4.5 times the height H of streetlamp poles and the width W of a lane 121 is about a half of the height H of the streetlamp poles. The solid line polar plot shows the luminance distribution on the line A1-A1 shown in FIG. 1a and the dashed line polar plot shows the luminance distribution on the line A2-A2 that is on the middle of the lane 121. Angles $\varphi_1$ and $\varphi_2$ are defined in FIG. 1c and angles $\varphi_3$ and $\varphi_4$ are defined in FIG. 1b. An ideal situation would be such that the luminance is at a suitable level and uniform on the surface of the road. In FIG. 1d, a circle arc 124 illustrates a situation where the luminance is uniformly distributed.

It is inherent that it becomes more and more challenging to achieve a luminance distribution that is sufficiently uniform in the longitudinal direction of the road 120 when the distance D between adjacent streetlamps is increased. On the other hand, the costs of the street lighting can be reduced by increasing the distance D. Thus, there is a clear economic incentive to increase the distance D between adjacent streetlamps.

SUMMARY OF THE INVENTION

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In this document, the word "geometric" when used as a prefix means a geometric concept that is not necessarily a part of any physical object. The geometric concept can be for example a geometric point, a straight or curved geometric line, a geometric plane, a non-planar geometric surface, a geometric space, or any other geometric entity that is zero, one, two, or three dimensional.

In accordance with the invention, there is provided a new optical device for modifying a light distribution pattern of a light source radiating first light beams to a first geometric quarter-space and second light beams to a second geometric quarter-space, the first and second geometric quarter-spaces being defined by mutually perpendicular first and second geometric planes so that the first geometric plane constitutes a boundary between the first and second geometric quarter-spaces. An optical device according to the invention comprises:

a lens-section for acting as a lens for modifying the light distribution pattern of the first light beams, and a reflector surface for reflecting at least a part of the second light beams from the second geometric quarter-space to the first geometric quarter-space so that arrival angles of the at least part of the second light beams with respect to geometric normal lines of the reflector surface are greater than a critical angle of total reflection when the at least part of the second light beams arrive, from inside transparent material of the optical device, at the reflector surface, The above-mentioned reflector surface is shaped so that:

each geometric section curve between the reflector surface and a geometric plane parallel with the second geometric plane is wedge-shaped and has an apex pointing towards the first geometric quarter-space, and the reflector surface comprises one or more areas where projections of the arrival angles on a geometric projection plane perpendicular to the first and second geometric planes are less than the critical angle, each of the projections of the arrival angles being an angle between a projection of a corresponding one of the second light beams and a projection of a corresponding one of the geometric normal lines of the reflector surface on the geometric projection plane.

On the above-mentioned one or more areas of the reflector surface, the total reflection is achieved with the aid of the wedge-shaped form of the reflector surface and thus the reflected second light beams are directed more to sideward directions and less downwards than e.g. in the case illustrated in FIG. 1f where the total reflection is achieved by placing the reflector surface 108 obliquely with respect to the z-direction of the coordinate system 199. The above-mentioned one or more areas may cover e.g. at least 50% of the reflector surface.

The fact that the light distribution pattern of the reflected second light beams is directed in the above-described way facilitates achieving for example a sufficiently uniform distribution of luminance in the longitudinal direction of a road when the above-described optical device is used in a street lighting application.

In accordance with the invention, there is provided also a new lighting fixture comprising at least one light source and at least one optical device according to the invention. The at least one light source may comprise, for example, one or more light emitting diodes "LED".

In accordance with the invention, there is provided also a new system comprising a road and at least one streetlamp comprising at least one lighting fixture according to the invention, wherein each optical device of the least one lighting fixture is positioned with respect to the road so that a geometric section line between the above-mentioned first and second geometric planes related to the optical device under consideration is substantially parallel with the longitudinal direction of the road.

In accordance with the invention, there is provided also a new mold having a form suitable for manufacturing, by mold casting, a transparent piece constituting one or more optical devices according to invention.

Various exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying embodiments when read in conjunction with the accompanying drawings.

The verbs "to comprise" and "to include" are used in this document as open limitations that neither exclude nor require the existence of also un-recited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

The exemplifying and non-limiting embodiments of the invention and their advantages are explained in greater detail below with reference to the accompanying drawings, in which:

FIGS. 1a, 1b and 1c show a schematic illustration of a street lighting application according to the prior art, FIG. 1d shows polar plots illustrating simulated luminance distributions on the surface of a road shown in FIGS. 1a-1c when optical devices according to the prior art are used, FIGS. 5a, 5b and 5c illustrate a street lighting application according to an exemplifying and non-limiting embodiment of the invention.

FIGS. 1a-1f have already been explained in the Background-section of this document.

DETAILED DESCRIPTION OF EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 2A:
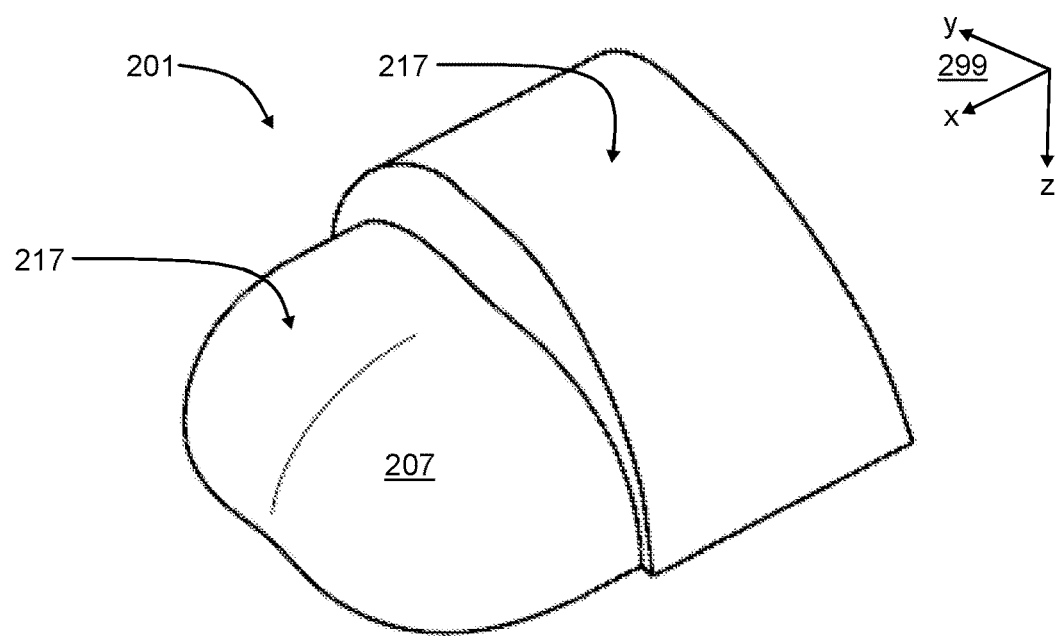
FIGS. 2a, 2b, 2c and 2d illustrate an optical device according to an exemplifying and non-limiting embodiment of the invention.
Figure 2B:
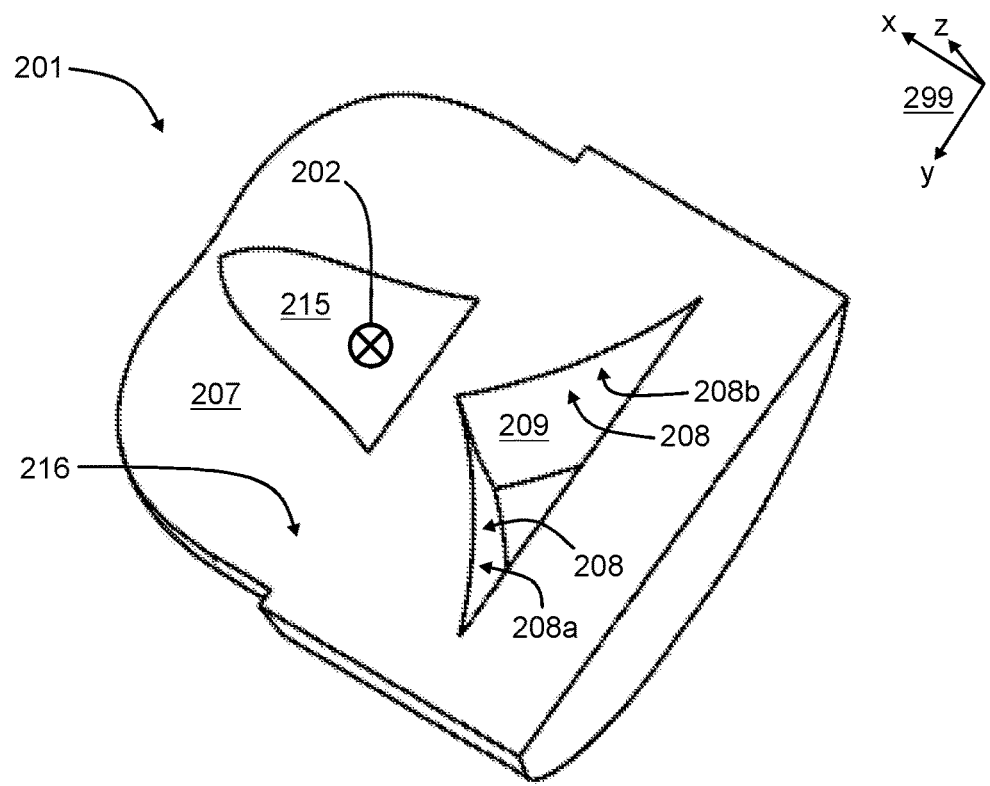
Figure 2C:
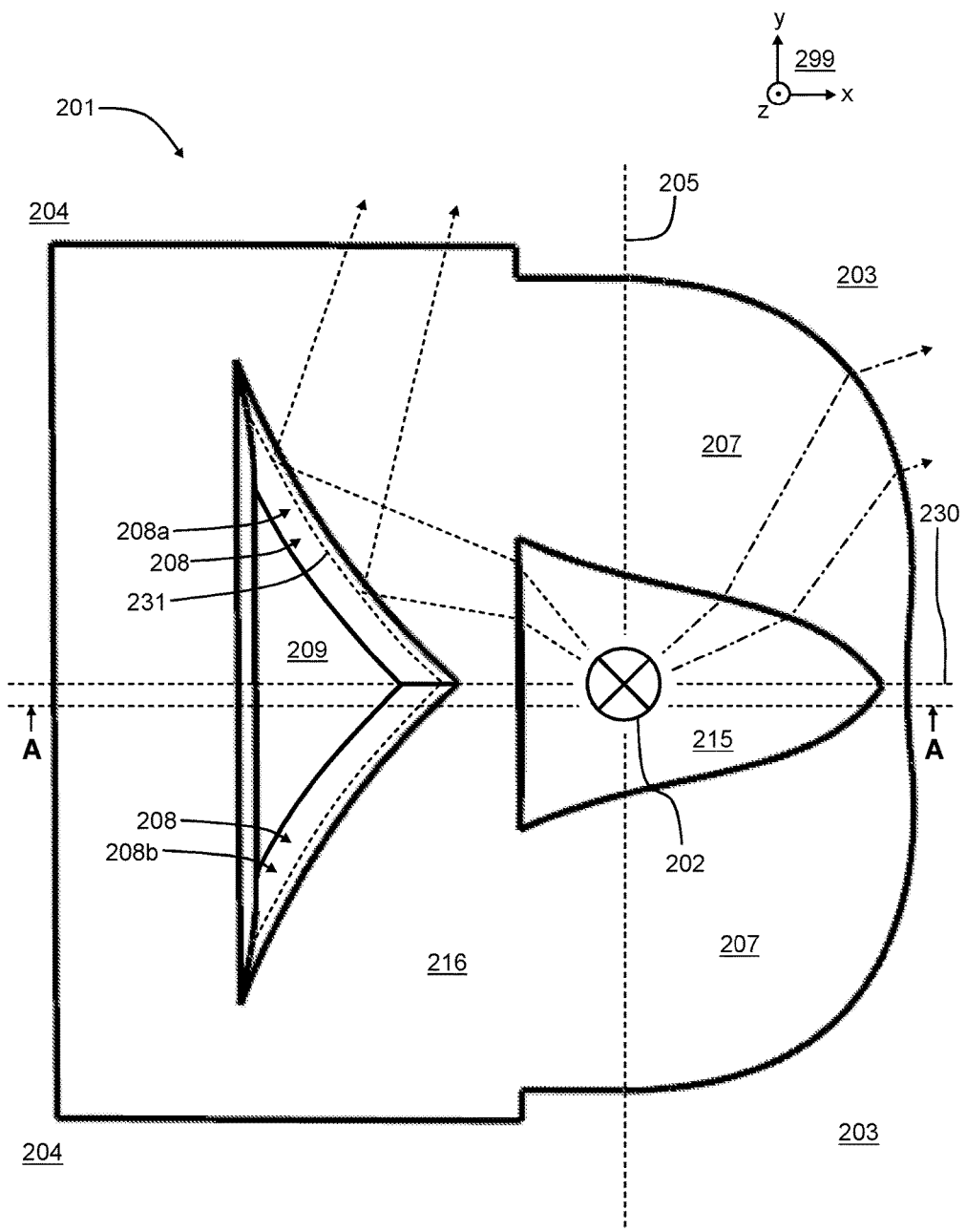
Figure 2D:
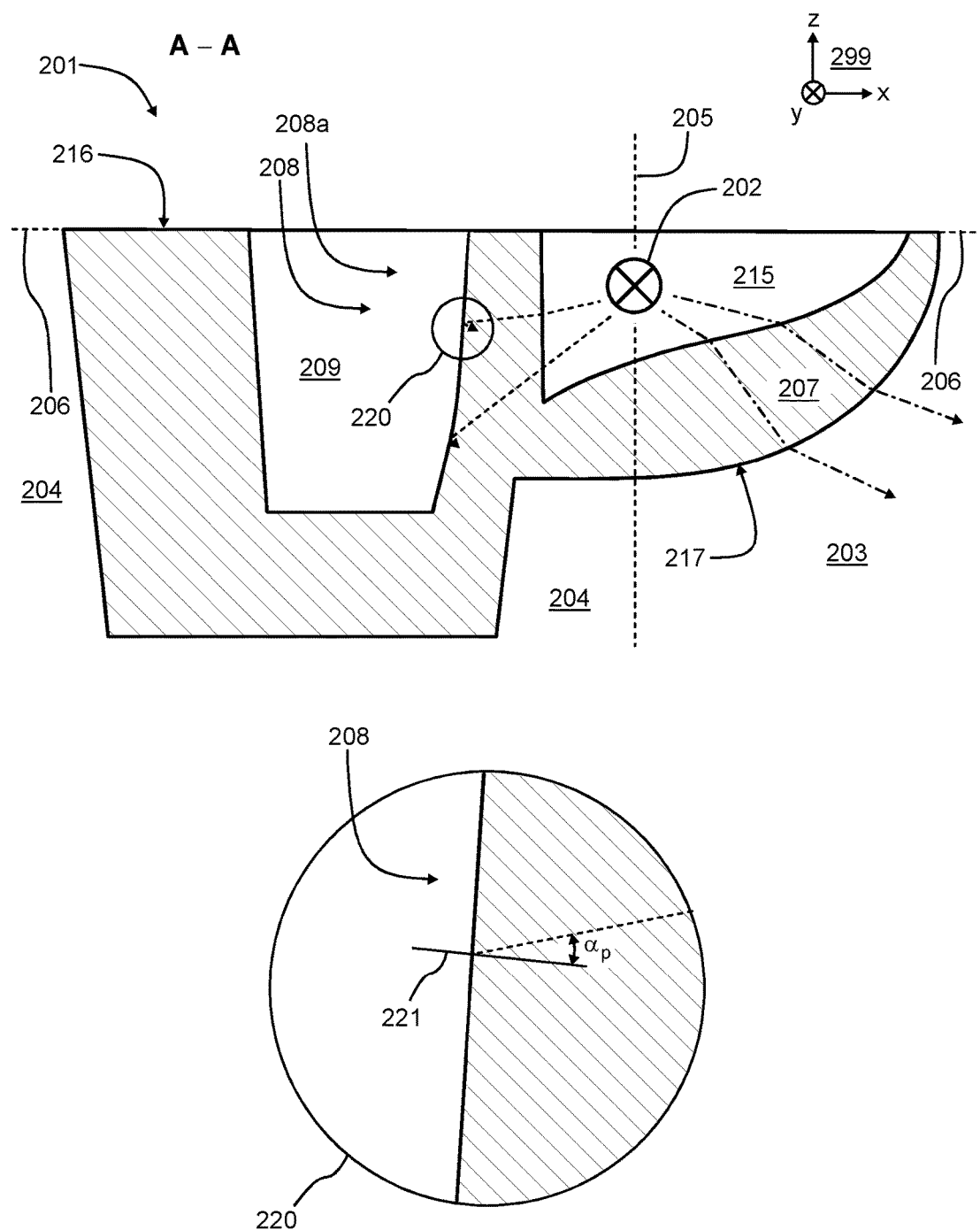

FIGS. 2a and 2b show isometric views of an optical device 201 according to an exemplifying and non-limiting embodiment of the invention for modifying a light distribution pattern of a light source 202 that can be, for example but not necessarily, a light emitting diode "LED", a filament lamp, or a gas-discharge lamp. The viewing directions related to FIGS. 2a and 2b are illustrated with a coordinate system 299. FIG. 2c shows the optical device 201 when seen against the positive z-direction of the coordinate system 299. FIG. 2d shows a view of a section taken along the line A-A shown in FIG. 2c. The section plane is parallel with the xz-plane of the coordinate system 299. As illustrated in FIGS. 2c and 2d, the light source 202 is arranged to radiate first light beams to a first geometric quarter-space 203 and second light beams to a second geometric quarter-space 204, where the first and second geometric quarter-spaces are defined by mutually perpendicular first and second geometric planes 205 and 206 so that the first geometric plane 205 constitutes a boundary between the first and second geometric quarter-spaces 203 and 204. In FIGS. 2c and 2d, some of the above-mentioned first light beams are depicted with dot-and-dash line arrows and some of the above-mentioned second light beams are depicted with dashed line arrows. It is to be noted that the above-mentioned first and second geometric planes 205 and 206 are mere geometrical concepts for illustrative purposes only but not physical elements of the optical device 201 or of the light source 202. The first geometric plane 205 is parallel with the yz-plane of a coordinate system 299 and the second geometric plane 206 is parallel with the xy-plane of the coordinate system 299. The optical device 201 is made of transparent material whose refractive index is greater than one. The transparent material can be for example acrylic plastic, polycarbonate, optical silicone, or glass. The method of manufacture of the optical device 201 can be for example mold casting.

The optical device 201 comprises a lens-portion 207 for modifying the light distribution pattern of the first light beams. The optical device 201 comprises a reflector surface 208 for reflecting at least a part of the second light beams from the second geometric quarter-space 204 to the first geometric quarter-space 203 so that arrival angles of the at least part of the second light beams with respect to geometric normal lines of the reflector surface 208 are greater than the critical angle of total reflection when the at least part of the second light beams arrive, from inside the transparent material of the optical device, at the reflector surface 208. In addition to the second light beams which are reflected by the reflector surface 208, the light source 202 may radiate, to the second geometric quarter-space 204, light beams that do not fall on the reflector surface 208. The reflector surface 208 is shaped so that each geometric section curve between the reflector surface 208 and a geometric plane parallel with the xy-plane of the coordinate system 299 is wedge-shaped and has an apex pointing towards the first geometric quarter-space. 203. FIG. 2c shows an exemplifying geometric section curve 231 between the reflector surface 208 and a geometric plane that is parallel with the xy-plane of the coordinate system 299. The exemplifying geometric section curve 231 is depicted with a dashed line. The exemplifying geometric section curve 231 is a mere geometrical concept for illustrative purposes only but not a physical element of the optical device 201 or of the light source 202.

Figure 1E:
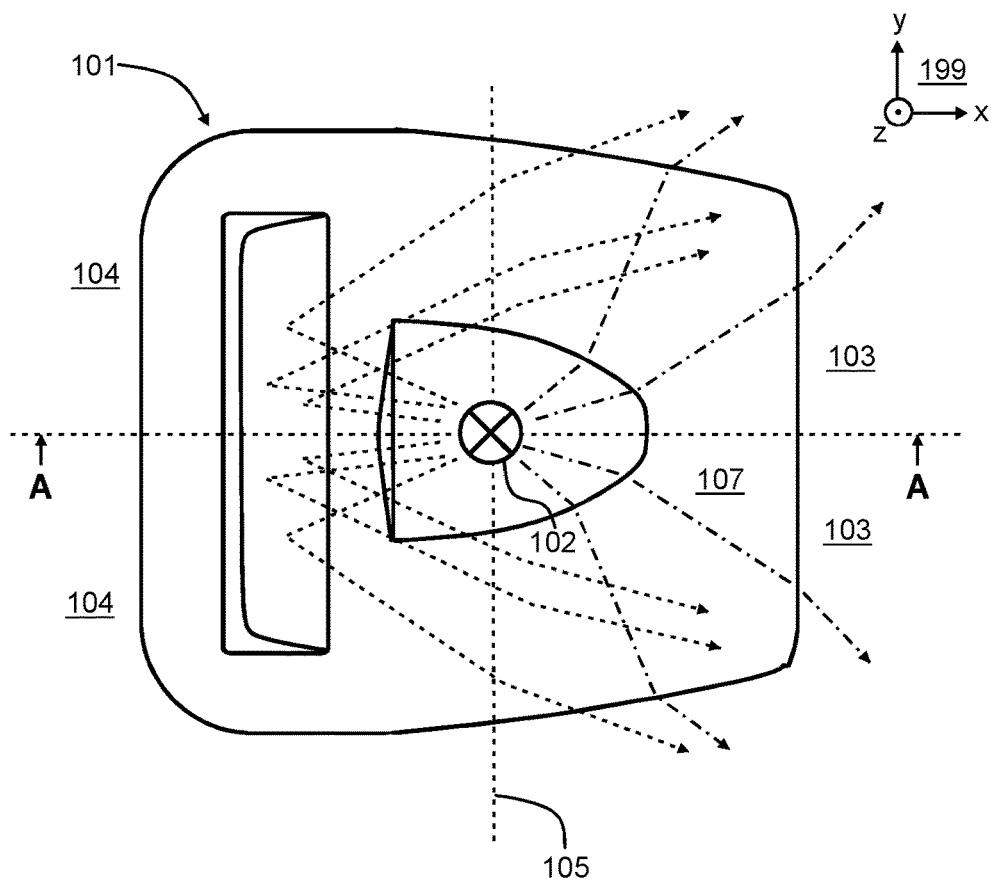
FIGS. 1e and 1f illustrate an optical device according to the prior art.
Figure 1F:
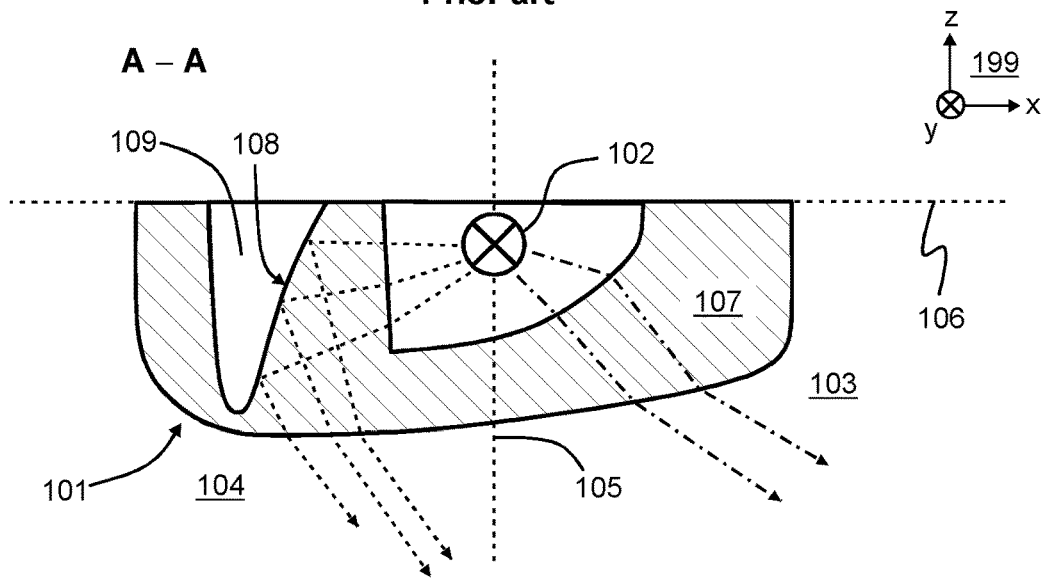

The reflector surface 208 comprises areas where projections of the above-mentioned arrival angles on a geometric projection plane, which is perpendicular to the first and second geometric planes 205 and 206, are less than the critical angle of total reflection. In FIG. 2d, the section plane corresponds to the above-mentioned geometric projection plane. The projection of each arrival angle is an angle between a projection of a corresponding one of the second light beams and a projection of a corresponding one of the geometric normal lines of the reflector surface 208 on the above-mentioned geometric projection plane. A magnified view 220 shows the projection $\alpha_p$ of the arrival angle of one of the second light beams with respect to a corresponding geometric normal line of the reflector surface 208. In the magnified view 220, the projection of the geometric normal line of the reflector surface is denoted with a reference 221 and the projection of the one of the second light beams is depicted with a dashed line. The projection $\alpha_p$ of the arrival angle is less than the critical angle of total reflection, and thus the total reflection is achieved with the aid of the wedge-shaped form of the reflector surface 208 and therefore the reflected second light beams are directed more to sideward directions and less downwards than e.g. in the case illustrated in FIG. 1f where the total reflection is achieved by placing the reflector surface 108 obliquely with respect to the z-direction of the coordinate system 199. The areas where the projections of the arrival angle are less than the critical angle of total reflection may cover e.g. at least 30%, or at least 50%, or at least 70% of the reflector surface 208.

As illustrated in FIGS. 2b and 2c, the reflector surface 208 of the exemplifying optical device 201 is substantially symmetric with respect to a third geometric plane 230 that is parallel with the xz-plane of the coordinate system 299. The reflector surface 208 comprises a first portion 208a and a second portion 208b which are substantially mirror images of each other. Different shapes of the reflector surface are, however, also possible. The above-mentioned third geometric plane 230 is a mere geometrical concept for illustrative purposes only but not a physical element of the optical device 201 or of the light source 202. As illustrated in FIGS. 2a-2c, the exemplifying optical device 201 is substantially symmetric with respect to the above-mentioned third geometric plane.

In the exemplifying case illustrated in FIGS. 2a-2d, the optical device 201 is a single piece of transparent material. The optical device 201 comprises a first cavity 215 for constituting a place for the light source 202 as illustrated in FIGS. 2b-2d. The optical device 201 comprises a second cavity 209 whose surface constitutes the reflector surface 208 so that the total reflection takes place when light beams arrive, from inside the transparent material, at the reflector surface 208 of the second cavity 209. The first and second cavities 215 and 209 are formed so that a first surface 216 of the optical device 201 comprises pits constituting the first and second cavities 215 and 209, and the first surface 216 is substantially planar on regions surrounding the pits. A second surface 217 of the optical device is shaped so that a desired light distribution is achieved. The first surface 216 can be installed for example to be against a circuit board where the light source 202 is mounted on a surface of the circuit board.

Figure 3:
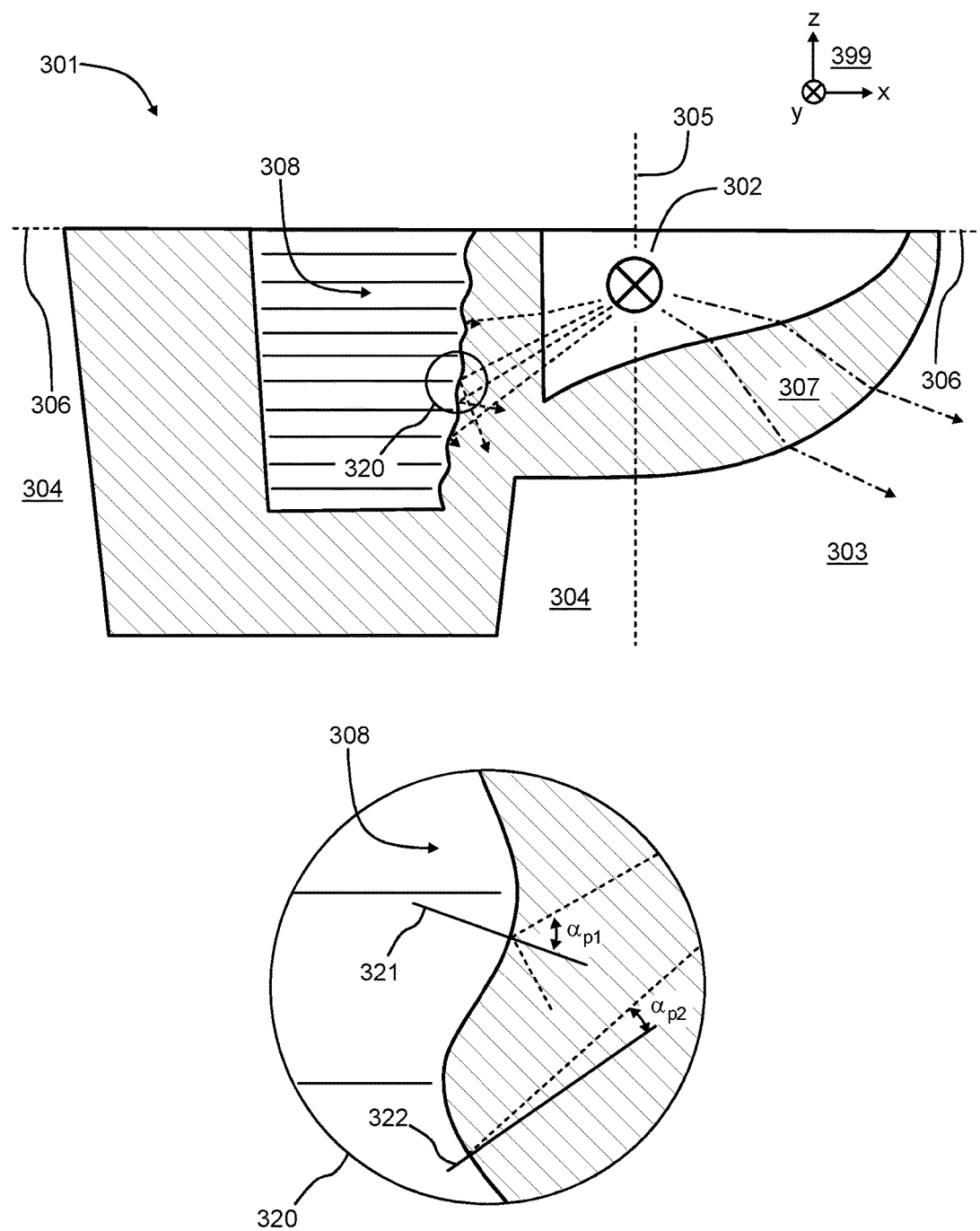
FIG. 3 illustrates an optical device according to another exemplifying and non-limiting embodiment of the invention.

FIG. 3 shows a section view of an optical device 301 according to another exemplifying and non-limiting embodiment of the invention for modifying a light distribution pattern of a light source 302. The section plane is parallel with the xz-plane of a coordinate system 399. The light source 302 is arranged to radiate first light beams to a first geometric quarter-space 303 and second light beams to a second geometric quarter-space 304, where the first and second quarter-spaces are defined by mutually perpendicular first and second geometric planes 305 and 306 so that the first geometric plane 305 constitutes a boundary between the first and second geometric quarter-spaces. The first geometric plane 305 is parallel with the yz-plane of a coordinate system 399 and the second geometric plane 306 is parallel with the xy-plane of the coordinate system 399. In FIG. 3, some of the first light beams are depicted with dot-and-dash line arrows and some of the second light beams are depicted with dashed line arrows. The optical device 301 comprises a lens-section 307 for modifying the light distribution pattern of the first light beams. The optical device 301 comprises a reflector surface 308 for reflecting at least a part of the second light beams to the first geometric quarter-space 303 so that arrival angles of the at least part of the second light beams with respect to geometric normal lines of the reflector surface 308 are greater than the critical angle of total reflection when the at least part of the second light beams arrive, from inside transparent material of the optical device, at the reflector surface 308. In addition to the second light beams which are reflected by the reflector surface 308, the light source 302 may radiate, to the second quarter-space 304, light beams that do not fall on the reflector surface 308.

The reflector surface 308 is shaped so that each geometric section curve between the reflector surface 308 and a geometric plane parallel with the xy-plane of the coordinate system 399 is wedge-shaped and has an apex pointing towards the first geometric quarter-space. 303. In this exemplifying case, the reflector surface 308 is shaped to have undulations which are parallel with the second geometric plane 306. The reflector surface 308 comprises areas where projections of the above-mentioned arrival angles on a geometric projection plane, which is perpendicular to the first and second geometric planes 305 and 306, are less than the critical angle of total reflection. In FIG. 3, the section plane corresponds to the above-mentioned geometric projection plane. The projection of each arrival angle is an angle between a projection of a corresponding one of the second light beams and a projection of a corresponding one of the geometric normal lines on the above-mentioned geometric projection plane. In FIG. 3, projections $\alpha_{p1}$ and $\alpha_{p2}$ of arrival angles are shown in a magnified view 320. Projections of geometric normal lines of the reflector surface 308 are denoted with reference 321 and 322, and the projections of the respective light beams are depicted with dashed lines. In this exemplifying case, the projection $\alpha_{p1}$ is greater than the critical angle of total reflection and the projection $\alpha_{p2}$ is less than the critical angle of total reflection. On areas where the projections of arrival angles are less than the critical angle of total reflection, the total reflection is achieved with the aid of the wedge-shaped form of the reflector surface 308 and therefore light beams reflected on these areas are directed more to sideward directions and less downwards than e.g. in the case illustrated in FIG. 1f.

Figure 4A:
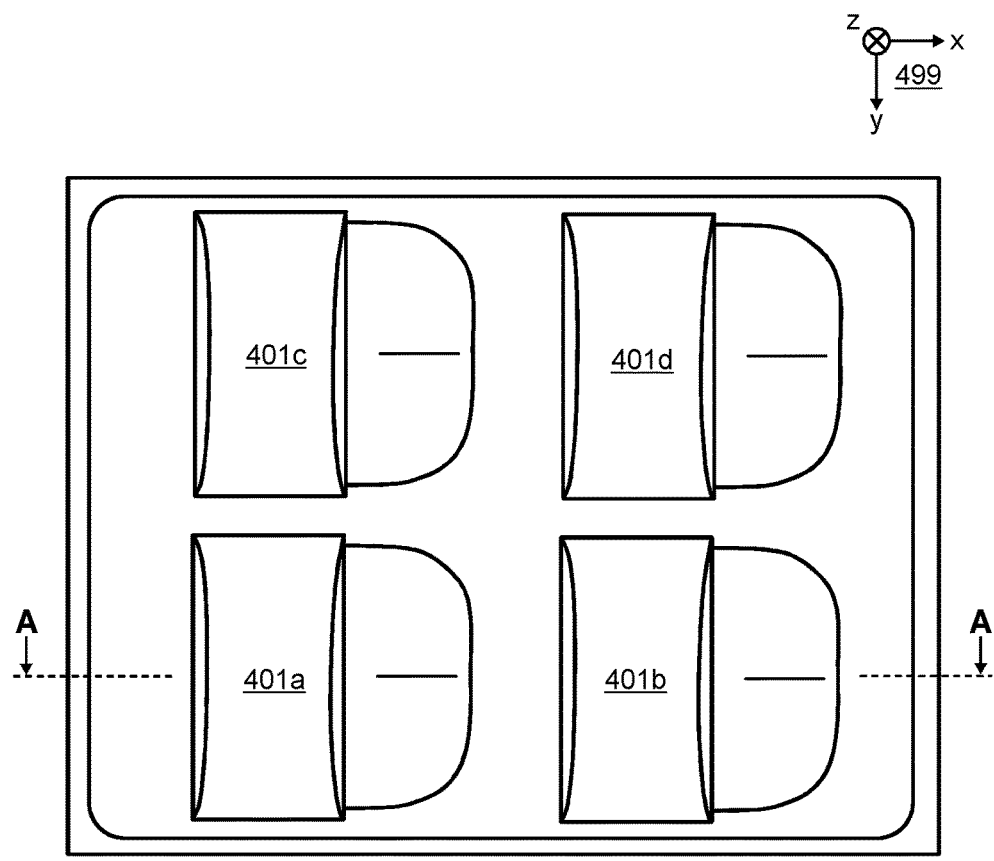
FIGS. 4a and 4b illustrate a lighting fixture according to an exemplifying and non-limiting embodiment of the invention.
Figure 4B:
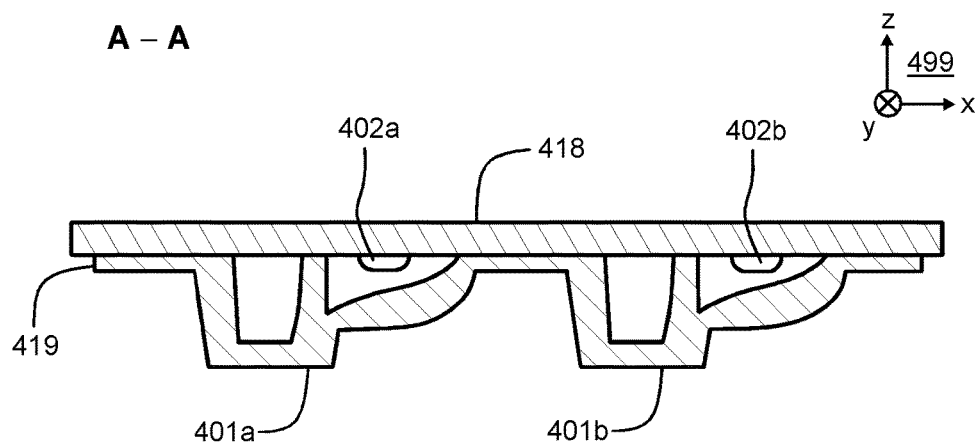

FIGS. 4a and 4b illustrate a lighting fixture according to an exemplifying and non-limiting embodiment of the invention. FIG. 4b shows a view of a section taken along the line A-A shown in FIG. 4a. The section plane is parallel with the xz-plane of a coordinate system 499. The lighting fixture comprises four light sources and four optical devices 401a, 401b, 401c and 401d. Each of the optical devices is according to an exemplifying and non-limiting embodiment of the invention. In FIG. 4b, two of the light sources are depicted with references 402a and 402b. Each of the optical devices 401a-401d can be for example such as illustrated in FIGS. 2a-2d. Each of the light sources may comprise at least one light emitting diode "LED". In the exemplifying case illustrated in FIGS. 4a and 4b, the lighting fixture further comprises a circuit board 418. In this exemplifying case, the optical devices 401a-401d are parts of a single piece 419 of transparent material. The light sources are located on a surface of the circuit board 418 and in cavities of the optical devices 401a-401d as illustrated in FIG. 4b.

FIG. 5a shows a schematic illustration of a street lighting application where streetlamps 522 and 523 are arranged to illuminate a road 520. FIG. 5b shows a view of a section taken along the line A1-A1 shown in FIG. 5a, and FIG. 5c shows a view of a section taken along the line A2-A2 shown in FIG. 5a. Each of the streetlamps 522 and 523 comprises one or more lighting fixtures each of which comprises one or more light sources, e.g. light emitting diodes "LED", and one or more optical devices for modifying a light distribution pattern of the one or more light sources. Each optical device can be according to what is illustrated in FIGS. 2a-2d or in FIG. 3. Each optical device is positioned with respect to the road 520 so that the geometric section line between the first and second geometric planes related to the optical device under consideration is substantially parallel with the longitudinal direction of the road. The above-mentioned first and second geometric planes are defined above with reference to FIGS. 2c and 2d and to FIG. 3.

The specific examples provided in the description given above should not be construed as limiting the scope and/or the applicability of the appended claims. Lists and groups of examples provided in the description given above are not exhaustive unless otherwise explicitly stated.

What is claimed is:

1. An optical devices for modifying a light distribution pattern of a light source radiating first light beams to a first geometric quarter-space and second light beams to a second geometric quarter-space, the first and second geometric quarter-spaces being defined by mutually perpendicular first and second geometric planes so that the first geometric plane constitutes a boundary between the first and second geometric quarter-spaces, the optical device comprising:
   a lens-section for acting as a lens for modifying a light distribution pattern of the first light beams, and
   a reflector surface for reflecting at least a part of the second light beams from the second geometric quarter-space to the first geometric quarter-space so that arrival angles of the at least part of the second light beams with respect to geometric normal lines of the reflector surface are greater than a critical angle of total reflection when the at least part of the second light beams arrive, from inside transparent material of the optical device, at the reflector surface,
wherein the reflector surface is shaped so that each geometric section curve between the reflector surface and a geometric plane parallel with the second geometric plane is wedge-shaped and has an apex pointing towards the first geometric quarter-space, and wherein the reflector surface includes one or more areas where projections of the arrival angles on a geometric projection plane perpendicular to the first and second geometric planes are less than the critical angle, wherein each of the projections of the arrival angles is an angle between a projection of a corresponding one of the second light beams and a projection of a corresponding one of the geometric normal lines of the reflector surface on the geometric projection plane.

2. The optical device according to claim 1, wherein the one or more areas cover at least 30% of the reflector surface.

3. The optical device according to claim 1, wherein the one or more areas cover at least 50% of the reflector surface.

4. The optical device according to claim 1, wherein the one or more areas cover at least 70% of the reflector surface.

5. The optical device according to claim 1, wherein the reflector surface is substantially symmetric with respect to a third geometric plane perpendicular to the first and second geometric planes so that the reflector surface has a first portion and a second portion which are substantially mirror images of each other.

6. The optical device according to claim 1, wherein the optical device further comprises a first cavity for constituting a place for the light source and a second cavity whose surface constitutes the reflector surface.

7. The optical device according to claim 1, wherein the optical device is made of one of the following: acrylic plastic, polycarbonate, optical silicone or glass.

8. The optical device according to claim 5, wherein the optical device is substantially symmetric with respect to the third geometric plane.

9. The optical device according to claim 6, wherein a first surface of the optical device includes pits constituting the first and second cavities and the first surface of the optical device is substantially planar on regions surrounding the pits.

10. A lighting fixture comprising a light source and an optical device for modifying a light distribution pattern of the light source radiating first light beams to a first geometric quarter-space and second light beams to a second geometric quarter-space, the first and second geometric quarter-spaces being defined by mutually perpendicular first and second geometric planes so that the first geometric plane constitutes a boundary between the first and second geometric quarter-spaces, the optical device including:
   a lens-section for acting as a lens for modifying a light distribution pattern of the first light beams, and
   a reflector surface for reflecting at least a part of the second light beams from the second geometric quarter-space to the first geometric quarter-space so that arrival angles of the at least part of the second light beams with respect to geometric normal lines of the reflector surface are greater than a critical angle of total reflection when the at least part of the second light beams arrive, from inside transparent material of the optical device, at the reflector surface,
wherein the reflector surface is shaped so that each geometric section curve between the reflector surface and a geometric plane parallel with the second geometric plane is wedge-shaped and has an apex pointing towards the first geometric quarter-space, and wherein the reflector surface comprises one or more areas where projections of the arrival angles on a geometric projection plane perpendicular to the first and second geometric panes are less than the critical angle, wherein each of the projections of the arrival angles is an angle between a projection of a corresponding one of the second light beams and a projection of a corresponding one of the geometric normal lines of the reflector surface on the geometric protection plane.

11. The lighting fixture according to claim 10, wherein the lighting fixture further comprises a circuit board and the optical device further includes a first cavity for constituting a place for the light source and a second cavity whose surface constitutes the reflector surface, a first surface of the optical device comprising pits constituting the first and second cavities and being substantially planar on regions surrounding the pits and the planar regions of the first surface of the optical device being against the circuit board and the light source being in the first cavity.

12. The lighting fixture according to claim 10, wherein the lighting fixture further comprises at least one other optical device and at least one other light source, the optical devices being constituted by a single piece of transparent material having a refractive index greater than one.

13. A mold comprising a form suitable for manufacturing, by mold casting, a transparent piece constituting one or more optical devices each being suitable for modifying a light distribution pattern of a light source radiating first light beams to a first geometric quarter-space and second light beams to a second geometric quarter-space, the first and second geometric quarter-spaces being defined by mutually perpendicular first and second geometric planes so that the first geometric plane constitutes a boundary between the first and second geometric quarter-spaces, each of the one or more optical devices including:
 a lens-section for acting as a lens for modifying a light distribution pattern of the first light beams, and
 a reflector surface for reflecting at least a part of the second light beams from the second geometric quarter-space to the first geometric quarter-space so that arrival angles of the at least part of the second light beams with respect to geometric normal lines of the reflector surface are greater than a critical angle of total reflection when the at least part of the second light beams arrive from inside transparent material of the optical device, at the reflector surface,
wherein the reflector surface is shaped so that each geometric section curve between the reflector surface and a geometric plane parallel with the second geometric plane is wedge-shaped and has an apex pointing towards the first geometric quarter-space, and wherein the reflector surface comprises one or more areas where projections of the arrival angles on a geometric projection plane perpendicular to the first and second geometric planes are less than the critical angle, wherein each of the projections of the arrival angles is an angle between a projection of a corresponding one of the second light beams and a projection of a corresponding one of the geometric normal lines of the reflector surface on the geometric projection plane.

14. A system comprising a road and a streetlamp, said streetlamp including at least one lighting fixture having a light source and an optical device for modifying a light distribution pattern of the light source radiating first light beams to a first geometric quarter-space and second light beams to a second geometric quarter-space the first and second geometric quarter-spaces being defined by mutually perpendicular first and second geometric planes so that the first geometric plane constitutes a boundary between the first and second geometric quarter-spaces, the optical device including:
 a lens-section for acting as a lens for modifying a light distribution pattern of the first light beams, and
 a reflector surface for reflecting at least a part of the second light beams from the second geometric quarter-space to the first geometric quarter-space so that arrival angles of the at least part of the second light beams with respect to geometric normal lines of the reflector surface are greater than a critical angle of total reflection when the at least part of the second light beams arrive, from inside transparent material of the optic device, at the reflector surface,
wherein the reflector surface is shaped so that each geometric section curve between the reflector surface and a geometric plane parallel with the second geometric plane is wedge-shaped and has an apex pointing towards the first geometric quarter-space, and wherein the reflector surface comprises one or more areas where projections of the arrival angles on a geometric projection plane perpendicular to the first and second geometric planes are less than the critical angle, wherein each of the projections of the arrival angles is an angle between a projection of a corresponding one of the second light beams and a projection of a corresponding one of the geometric normal lines of the reflector surface on the geometric projection plane, and wherein each optical device of the least one lighting fixture is positioned with respect to the road so that a geometric section line between the first and second geometric planes related to the optical device under consideration is substantially parallel with a longitudinal direction of the road.

* * * * *